UNITED STATES PATENT OFFICE.

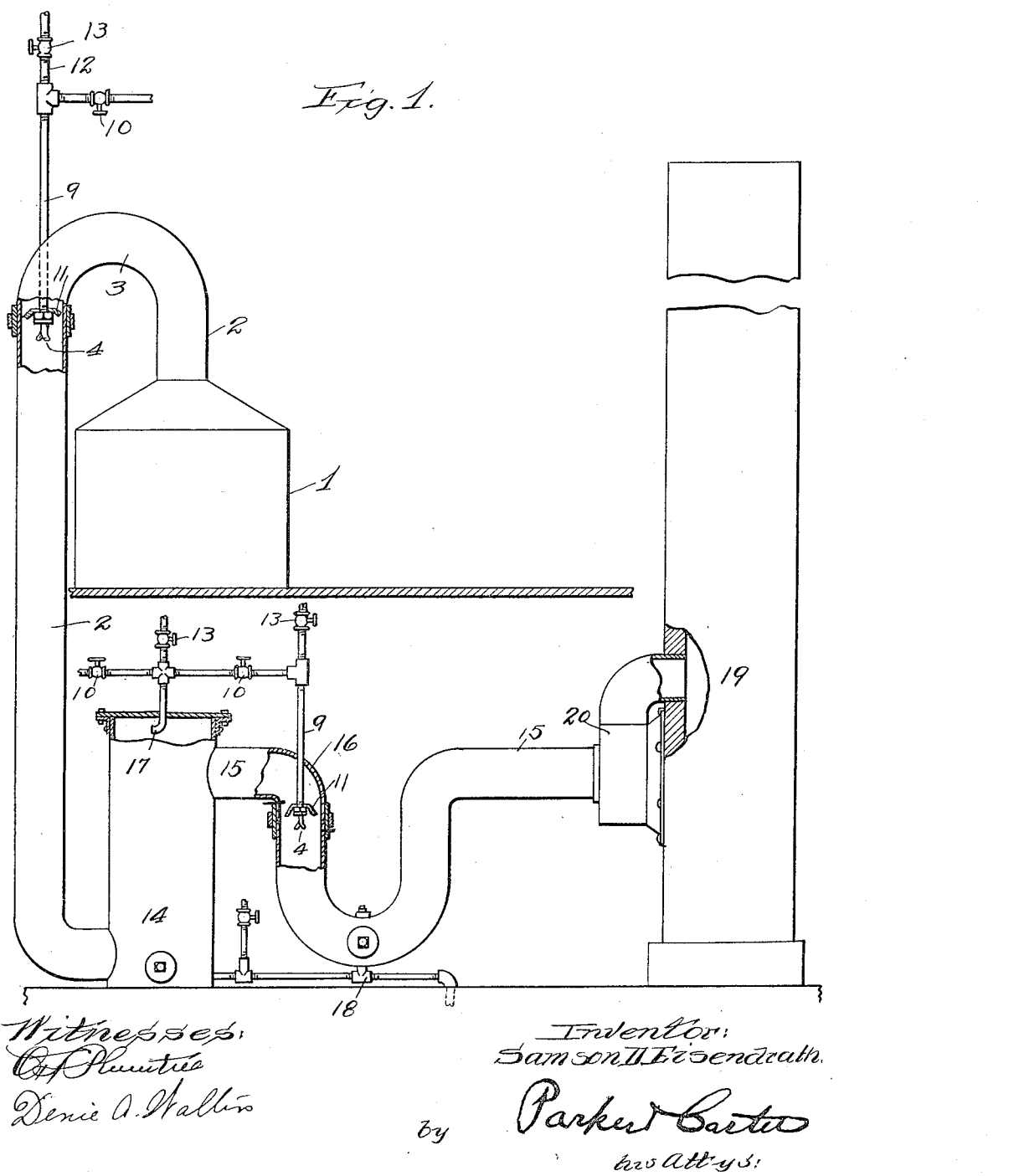

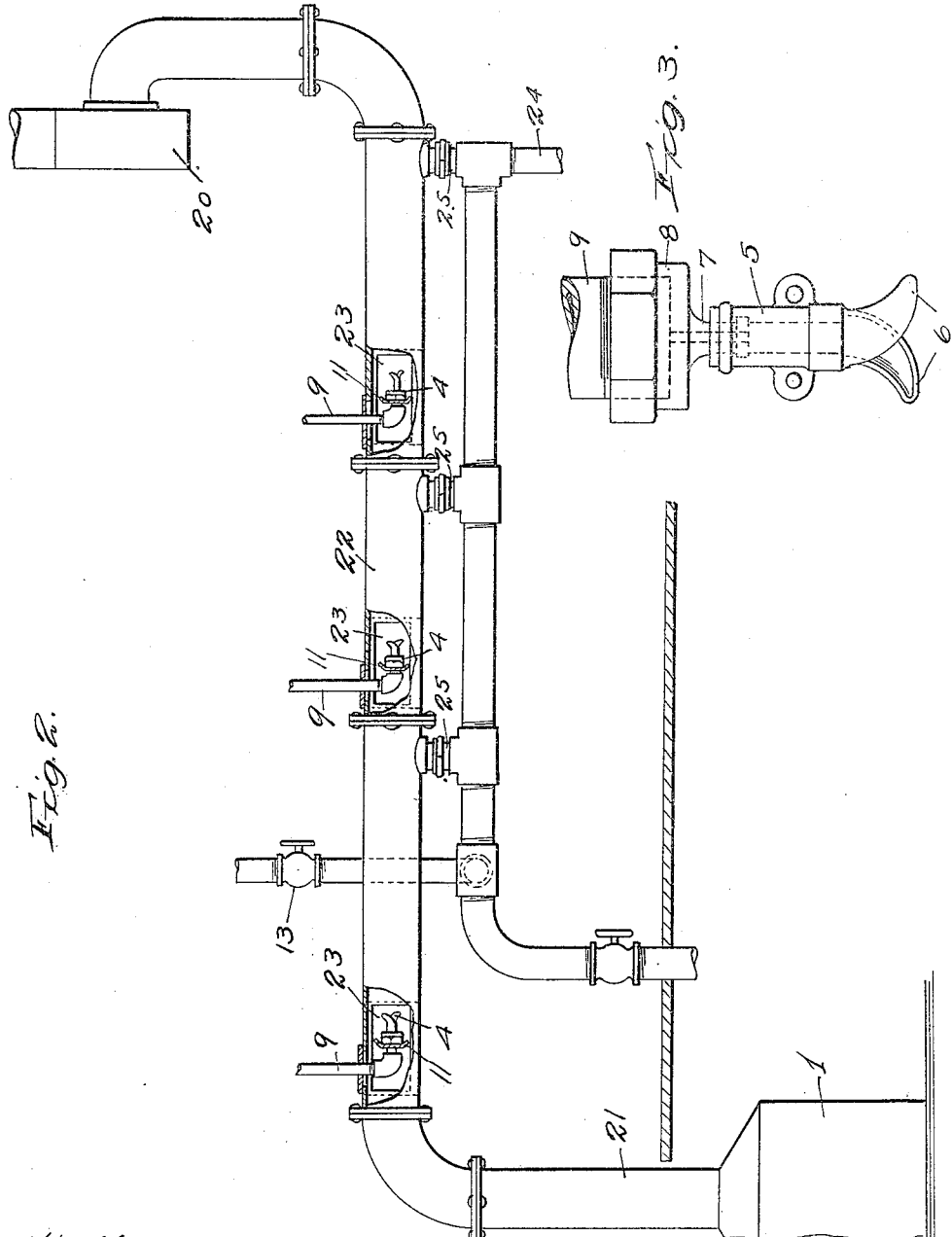

SAMSON D. EISENDRATH, OF CHICAGO, ILLINOIS.

DEVICE FOR ELIMINATING ODORS FROM GASES, FUMES, &c.

1,211,691. Specification of Letters Patent. Patented Jan. 9, 1917.

Application filed April 7, 1913. Serial No. 759,403.

*To all whom it may concern:*

Be it known that I, SAMSON D. EISENDRATH, a citizen of the United States, residing at Chicago, in the county of Cook and State of Illinois, have invented a certain new and useful Improvement in Devices for Eliminating Odors from Gases, Fumes, &c., of which the following is a specification.

This invention relates to a device for eliminating odors in certain processes of manufacture, and has for its object to provide an improved device of this description.

I have illustrated in the drawings certain means for carrying out the process.

Figure 1 shows one form of apparatus for this purpose; Fig. 2 shows another form of apparatus for this purpose; Fig. 3 is an enlarged view showing one form of spraying device.

Like numerals refer to like parts throughout the several figures.

This invention is particularly adapted to be used where objectionable odors are produced in treating oils, greases, butter, etc.

Referring to Fig. 1, I have shown a receptacle 1 in which is placed the material from which the objectionable odors are discharged. This receptacle is provided with any suitable means for heating it so as to raise it to the temperature desired. Connected with this receptacle is a discharge pipe 2 which is provided with a bend at 3. Beyond the bend 3, I have provided a spraying device 4 which discharges a fine spray of water into the pipe 2 so as to bring said water into contact with the gases, fumes or other materials passing through said pipe.

I have illustrated in Fig. 3 a particular construction of spraying device which consists of a rotating part 5 having wings 6, said rotating part mounted upon a hollow pipe 7 fastened to a base 8 which is attached to the discharge pipe 9. When the water is turned on by means of the valve 10, the rotating part 5 is rotated and the wings cause a fine spray of water to be discharged into the pipe 2, said spray covering the entire area of the pipe. I also prefer to provide the spraying device with a shield 11 which guides the gases, fumes and other materials passing through the pipe 2 beyond the joint between the part 5 and the pipe 7 so as to prevent corrosion thereof. I also provide a steam pipe connection 12 for the valve 13 arranged so that steam can also be blown into the pipe 9 and through the spraying device 4. The pipe 2 connects with the bottom of the tank 14, said tank being provided with a discharge pipe 15 having a bend 16, there being arranged at this bend, a spraying device 4. I may also provide a suitable spraying device 17 at the top of tank 14. The pipe 15 is provided with a connection 18 leading to the sewer so that the offensive matter may be discharged into the sewer. The pipe 15 may be connected to a smoke stack 19. Some suitable means is provided for removing the gases, fumes, etc. through the various pipes. As herein shown I provide a fan 20 for this purpose. The pipe 15 may be provided with any desired number of bends or spraying devices so as to insure proper removal of the offensive matter.

In Fig. 2, I have shown a different form of apparatus in which the receptacle 1 is provided with a discharge pipe 21 which has a substantially horizontal portion 22, this portion 22 being simply inclined sufficiently to cause the liquid in the pipe to flow therealong by gravity. I provide in the portion 22 of the pipe, a series of spraying devices 4 located at sufficient intervals, there being enough of these spraying devices to remove the offensive matter. The portion 22 of the pipe is provided with the man holes 23 by means of which access to the spraying devices may be had. The portion 22 of the pipe is provided with a suitable connection 24 to the sewer or other discharge point, and the water and offensive matter passes through the connections 25 into said pipe. This construction is also provided with a fan 20 for causing the proper removal of the gases, fumes, etc.

It will be seen that by means of this invention, the current of gases, fumes, etc. is successively sprayed at different points along its length so as to remove therefrom the objectionable matter and that the remaining portion is discharged into the air free from such objectionable matter, the water and objectionable matter being discharged into the sewer or at any other desired point.

I have illustrated a fan as producing the draft or current through the pipe but it is of course evident that the air may be blown in through the material if desired. It will be noted that the spray is injected into the current or draft in the same direction the current is traveling and therefore does not produce any back pressure or interfere with the current. This permits gases and other matter to pass off as freely as in an ordinary pipe, and in fact increases the draft because the spray condenses some of the material. This spray also separates the solid particles from the gas, the gas passing out the chimney in a purified condition, the solid matter and other objectionable matter being precipitated and discharged into the sewer. This construction permits great effectiveness and at the same time a low cost of installation and maintenance as it requires only a small amount of water.

I claim:

1. A device for eliminating odors from gases, fumes, etc. comprising a receptacle for the material to be treated, a pipe leading from said receptacle, a spraying device in said pipe for injecting a finely divided spray of water into the material passing therethrough and a shield for said spraying device.

2. A device for eliminating odors from gases, fumes, etc. comprising a receptacle for the material to be treated, a pipe leading from said receptacle, a spraying device in said pipe located in the path of the gases passing through the pipe and a shield suspended in front of said spraying device.

3. A device for eliminating odors from gases, fumes, etc. comprising a receptacle for the material to be treated, a connection between said receptacle and a discharge flue, a bend in said connection near said receptacle, a water pipe projecting into said connection at said bend, a spraying device in said pipe, a U-shaped bend in said connection, a liquid spraying device in said connection for directing the spray into said U-shaped bend, a shield in front of said spraying device and means separate from said spraying device for causing the gas to flow through said connection.

In testimony whereof, I affix my signature in the presence of two witnesses this 24th day of March 1913.

SAMSON D. EISENDRATH.

Witnesses:
 MINNIE I. SUNDFAR,
 DENIS A. WALTERS.

Copies of this patent may be obtained for five cents each, by addressing the "Commissioner of Patents, Washington, D. C."